July 20, 1943.  C. F. SCHORN  2,324,599
PRESSURE CARBURETOR
Filed Jan. 12, 1942
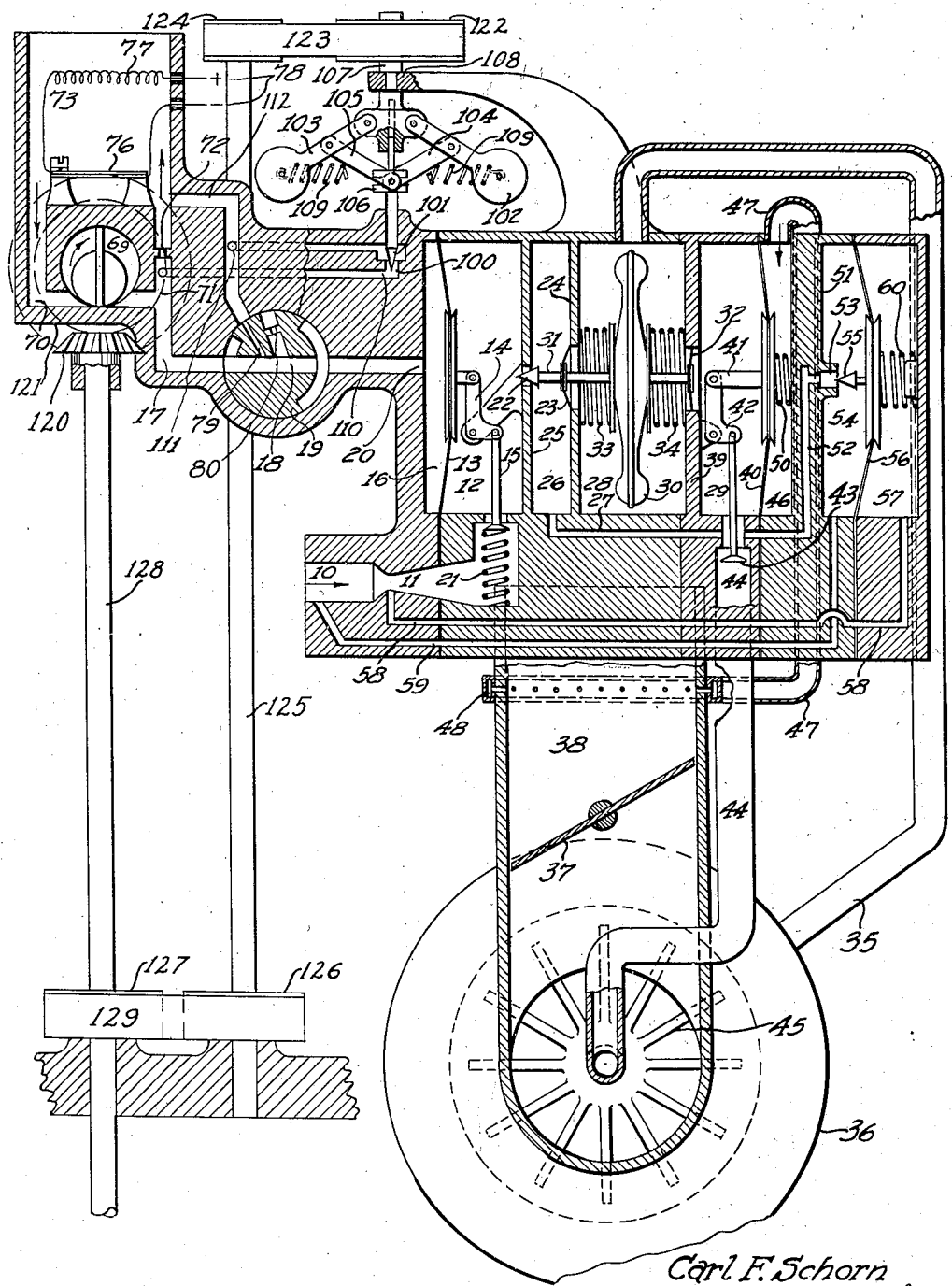
Carl F. Schorn
INVENTOR
BY
ATTORNEY Patented July 20, 1943

2,324,599

UNITED STATES PATENT OFFICE 2,324,599

PRESSURE CARBURETOR

Carl F. Schorn, Detroit, Mich., assignor to George M. Holley and Earl Holley

Application January 12, 1942, Serial No. 426,419

4 Claims. (Cl. 123—119)

The object of this invention is to regulate the fuel supply by means responsive to the manifold pressure and to the number of revolutions per minute developed by an internal combustion engine of the type in which an explosive mixture is controlled by a throttle and in which the charge is ignited by a spark plug.

There is a well known relation between the product of manifold pressure, or rather mixture density, and revolutions per minute developed by such an engine and the amount of air taken in by the engine. The weight of air taken in by each revolution of the engine is proportional to the density of the air in the inlet manifold, but as the speed of the engine increases, this density of the air in the inlet manifold is not a true criterion of the weight of the air in the cylinder because of the throttling effect of the inlet valve. Therefore, the density of the air in the inlet manifold must be modified by the number of revolutions per minute of the engine in order that the regulation of fuel may be such as to maintain the desired mixture ratio under the given conditions. The density of the air in the inlet manifold is measured by the absolute pressure of the air as compared with a vacuum as the relative pressure of the air in the inlet manifold is compared with the pressure of the outside air would be misleading. Therefore, a barometric device has to be incorporated in order that the absolute pressure of the air in the inlet manifold may be utilized as a factor in controlling the flow of fuel.

In the drawing, the figure shows diagrammatically the application of my invention to a fuel metering system for an airplane engine.

In the figure, oil pressure responsive to the revolutions per minute of the engine is obtained by means of a pump 69 driven at engine speed, or at some speed proportional thereto. This pump 69 obtains its supply of oil from a passage 70. Some of this oil is delivered through the entrance 17 to the mixture regulating device about to be described. The remainder of the oil returns through a passage 71 to an oil supply chamber 73. The pressure generated by the oil pump 69 is determined by the size of the restricted by-pass 72, by a variable by-pass 100, the effective area of which is determined by the movable needle valve 101 and by the oil which returns to 73 through a restricted passage 79 or through a restricted passage 80, both 79 and 80 being located in a valve 19 (the mixture control valve) through the center of which is an oil passage 18.

The movable needle valve 101 responds to engine speed because it is moved by governor weights 102 and 103 which, by means of links 104 and 105, engage with the slotted shoulder 106 on the needle valve 101. A drive shaft 107 is driven by a speed proportional to the engine speed and may well be driven on the same shaft as that which drives the oil pump 69. A bearing 108 is provided mounted on the mixture control box. A spring 109 connects the two weights 103 and 102 together. The assembly 102—109 constitutes an ordinary centrifugal governor having a spring counteracting a pair of weighted arms and of course, corresponds to the ordinary centrifugal governor which is found on all automobiles in the control of the ignition timing system.

The restriction 101 is connected by the passage 110 with the outlet from the oil pump 69 and the passage 111 is the return passage for the oil which passes through the restriction 100 and thus reaches the passage 112 which communicates with the chamber 73 which is the supply chamber for the oil pump 69.

In order that viscosity shall not be a factor, an oil heating coil 77 connected with the electric circuit 78 is provided and a thermostatically controlled switch 76 insures that the oil shall not fall below a certain temperature, as in that event the thermostat 76 closes the circuit and makes the electric circuit deliver electricity to flow through the heating coil 77 and thereby raise the temperature of the oil in the chamber 73 to the desired minimum temperature. This temperature is high enough so that any decrease in viscosity due to an increase in temperature above the temperature determined by the thermostat 76 will not materially change the mixture ratio.

The oil pressure which is determined by the pump 69 as modified by the centrifugal governor 102—109 is delivered from the passage 17 through the oil passages 18 and 19 to an oil chamber 16. In the position in which the mixture control valve is shown a small portion of the oil escapes through the small passage 79 to the return passage 112. If the mixture control valve is turned counter-clockwise, this passage 79 is cut off and after it is cut off then by a further movement anti-clockwise the valve 19 brings into action the restriction 80 which tends to lower the oil pressure at any given speed and to that extent corresponds to a cruising lean mixture. In any event a certain pressure is delivered through the passage 18 to the opening 20 to the oil chamber 16.

This oil chamber which is bounded on its right hand by the diaphragm 13 is connected to a bell crank lever 14 which controls the valve 15 which admits gasoline from the fuel entrance 10. A fuel venturi 11 acts as the entrance to a chamber 12 located on the right hand of the diaphragm 13. In order that the diaphragm 13 should not move without any load a spring 21 is provided which pushes up on the valve 15 and thereby rotates or tends to rotate the bell crank lever 14 to the left or anti-clockwise. With this arrangement, assuming gasoline under pressure in the fuel entrance 10 passing through the venturi 11, a pressure will be established in the chamber 12 which when assisted by the spring pressure 21 just balances the pressure in the chamber 16 generated by the oil pump 69, which oil pressure is modified by the centrifugal governor 102—109. Therefore, the pressure in the chamber 12 responds directly to the revolutions per minute at low engine speed, but is modified a second time by the speed of the engine at higher speeds than the minimum speed. Therefore, at lower speeds when the governor 102—109 is ineffective due to the strength of the spring 109, pressure in the chamber 12 responds directly to the revolutions per minute, and as the speed increases at a less rate then directly to the revolutions per minute of the engine.

Under the fuel pressure determined by the oil pressure in chamber 16, the fuel in the chamber 12 flows past the metering needle 22 into the chamber 26. The metering needle 22 is connected to a flexible diaphragm 23 mounted on the wall 24 which makes the right hand wall of the chamber 26, 25 being the left hand wall. The passage 27 connects the chamber 26 with the chamber 29, there being an intervening chamber 28 containing a barometric device 30 connected to the needle valve 22 through the shaft 31, which shaft is connected to the diaphragms 32 and 23. Balancing springs 33, 34 engage with the barometric element 30. The barometric element 30 is made of metal walls and is evacuated. The chamber 28 communicates through the pipe 35 to the supercharger 36. The pressure in the supercharger is controlled by a throttle 37 located in the air entrance 38 of the engine. Hence as the throttle 37 is opened and closed, the pressure in the chamber 28 varies and as it varies the barometric element 30 expands and contracts. Hence the needle 22 moves back and forth regulating the flow of fuel out of the chamber 12 into the chamber 26 and hence into the passage 27 and into the chamber 29. The valve 22 is contoured to give the desired mixture ratio at each air density.

The chamber 29 is bounded on the left by the wall 39 in which is located the diaphragm 32 and on the right by the flexible diaphragm 40 which is connected through link 41 with the bell crank lever 42 which raises and lowers the valve 43 which allows fuel to flow out of the chamber 29 into the passage 44 which discharges into the center of the rotating element 45 of the supercharger 36.

Located to the immediate right of the flexible diaphragm 40 is a chamber 46. This chamber is in communication with the atmosphere through the passage 47. The passage 47 should be at the same pressure as the air entrance 38 and for that reason a piezometer ring 48 having numerous small openings into the air entrance 38 is provided and this piezometer ring is connected through the pipe 47 with the upper part of the chamber 46. A spring 50 is provided which pushes to the left on the diaphragm 40 and is supported by the wall 51.

Inside the wall 41 there is a fuel passage 52 which has an inlet 53 out of a chamber 54, which inlet 53 is controlled by the needle valve 55 supported on the diaphragm 56. The diaphragm 56 forms the left hand wall of the chamber 57 which communicates through the pipe 58 which the throat of the venturi 11. The passage 59 communicates from the fuel entrance 10 to the chamber 54. The elements 50—58 are no part of this invention and merely constitute a well known enriching device in use in airplane carburetors today.

When the flow through the venturi 11 reaches a critical state, then the diaphragm 56 moves to the right compressing a spring 60 and moving the needle 55 to the right, admitting fuel to the passage 53 whence it flows down the passage 52 and merges with the fuel flowing through the passage 27 and both streams of fuel descend through the passage 44 to the center of the supercharger element 45. This is, of course, no part of the invention and is merely shown to make a complete picture. The essential elements of my invention comprise the chamber 28 containing the barometric element 30 which controls an orifice 22 which admits fuel from the chamber 12, the pressure in which is controlled by the speed of the engine. The pressure in chamber 12 equals the pressure in chamber 29 which is in equilibrium with the chamber 46 which is at atmospheric pressure and contains the spring 50. The contribution I have made is the recognition that the speed of the engine alone, is not sufficient and that the density of the air alone is not sufficient, but the speed of the engine must enter into the regulation of the fuel twice. Obviously the faster the engine goes, assuming a constant amount of fuel per revolution, the more fuel you need, but you do not require a constant amount of fuel per revolution because at maximum speed, there is a certain drop of pressure of the air as it flows into the inlet valve into the engine and therefore, as the speed becomes greater the governor elements 102—109 become effective, the needle valve 101 rises, the pressure in the chamber 16 falls, and you do not get, as you otherwise would, an excessive amount of fuel and this corrects for the throttling effect of the air entering the inlet valve of the engine.

The necessary increment of richness which is required at high fuel flows is controlled by the usual means shown from 50 to 60. Correction for either the throttle position 37 or by the change of air density is provided in the barometric element 30 which corrects both for altitude and for load. In other words, low pressure in the chamber 28 may be due to a closed throttle position or it may be due to a high altitude. In any event the needle 22 assumes the position determined by the pressure in the chamber 36 and fuel flows past 22 under the pressure determined by the pump 69 and governor 102—109. The pressure in chambers 26 and 29 varies with the atmospheric pressure only, so that the mixture ratio is independent of altitude and load and is only varied when the quantity of fuel flowing through the venturi 11 is great enough to overcome the pressure of the spring 60. This gives a flat characteristic to the curve showing mixture ratios at various air flows.

The means for getting the necessary fuel for idle and immediately off idle are not shown as this would complicate the disclosure unduly. Obviously special means are provided for giving the necessary fuel to idle and to transfer from idle to cruising lean.

In the event that the supercharger is omitted, the carburetor will respond to the pressure below the throttle. In other words, the device always responds to manifold pressure. The pump 69 is driven by the bevel gear 121 with which meshes the bevel gear 128 driven by the shaft 128 from the engine. The shaft 128 drives the pulley 127 which drives the belt 129 which drives the pulley 126 mounted on a shaft 125. The shaft 125 carries the pulley 124 which drives the belt 123 which drives the pulley 122 mounted on the shaft 107 of the governor. By this means the engine which drives the shaft 128 also drives the pump 69 and the governor 102, 103, 104, 105, 106 and 107.

This application is a continuation in part of my co-pending application Serial No. 390,520, filed April 26, 1941, entitled Torque controlled carburetor, now Patent No. 2,297,918.

What I claim is:

1. A pressure carburetor for an internal combustion engine, said carburetor having an air entrance, a throttle valve therein, a source of fuel under pressure, an entrance for said fuel, an engine-driven pump which generates pressure in proportion to the square of the revolutions per minute of the engine, a moving wall responsive on one side to said variable pressure, means for admitting fuel to the other side of the moving wall, means for controlling the fuel pressure to balance the pressure generated by the pump, a fuel chamber associated with said moving wall in which the fuel pressure is maintained at the pressure of said pump, a valve controlling the outlet from said chamber, an air outlet from said carburetor, and means responsive to the pressure in said outlet for opening said valve in proportion to an increase in the pressure in said outlet.

2. A pressure carburetor for an internal combustion engine, said carburetor having a source of fuel under pressure, an air entrance to the carburetor, an engine-driven pump which generates pressure in proportion to the square of the revolutions per minute of the engine, a moving wall responsive on one side to said variable pressure, means for admitting fuel to the other side of the moving wall, means for controlling the fuel pressure to balance the pressure generated by the pump, a fuel chamber associated with said moving wall in which the fuel pressure is thus maintained at the pressure of said pump, a valve controlling the outlet from said chamber, a supercharger for said engine, and means responsive to the pressure created by said supercharger for opening said valve in proportion to an increase of pressure created by said supercharger.

3. A device as set forth in claim 1 in which there is a centrifugal governor, means for driving said governor at a speed proportional to that of the engine, a by-pass to relieve the pressure generated by said pump, a valve therein, said valve being controlled by said governor.

4. A device as set forth in claim 2 in which there is a centrifugal governor, means for driving said governor at a speed proportional to that of the engine, a by-pass to relieve the pressure generated by said pump, a valve therein, said valve being controlled by said governor.

CARL F. SCHORN.

DISCLAIMER 2,324,599.—*Carl F. Schorn*, Detroit, Mich. PRESSURE CARBURETOR. Patent dated Ju.y 20, 1943. Disclaimer filed Sept. 7, 1945, by the inventor; the assignees, *George M. Holley* and *Earl Holley*, consenting.

Hereby enters this disclaimer to claims 1 and 2 of said patent.

[*Official Gazette October 9, 1945.*]